United States Patent [19]
Arimizu

[11] Patent Number: 5,254,245
[45] Date of Patent: Oct. 19, 1993

[54] MULTI-STAGE ANAEROBIC PACKED COLUMN REACTOR WITH FIXED-FILM COLUMN FILTER

[76] Inventor: Tsutome Arimizu, 29-15, Nishi-machi 3-chome, Kokubunji-shi, Tokyo, Japan

[21] Appl. No.: 865,038

[22] Filed: Mar. 31, 1992

[30] Foreign Application Priority Data

Apr. 1, 1991 [JP] Japan .................. 3-092686

[51] Int. Cl.$^5$ ............................ C02F 3/30; C02F 3/10
[52] U.S. Cl. .................................. 210/150; 210/151; 210/615; 210/605; 366/337; 366/340
[58] Field of Search ............. 210/605, 615, 616, 617, 210/150, 151, 534, 535; 366/337, 338, 340

[56] References Cited

U.S. PATENT DOCUMENTS

| | | | |
|---|---|---|---|
| 4,253,966 | 3/1981 | Lebesgue et al. | 210/617 |
| 4,627,917 | 12/1986 | Morper | 210/150 |
| 4,696,747 | 9/1987 | Verstraete et al. | 210/903 |
| 4,806,288 | 2/1989 | Nowosinski et al. | 366/337 |
| 4,818,404 | 4/1989 | McDowell | 210/630 |
| 4,874,560 | 10/1989 | Titmas | 366/338 |
| 4,966,704 | 10/1990 | Sarner | 210/617 |
| 4,9155522 | 5/1990 | Bateson et al. | 210/201 |

FOREIGN PATENT DOCUMENTS

| | | | |
|---|---|---|---|
| 2750814 | 6/1979 | Fed. Rep. of Germany | 210/150 |
| 1056196 | 3/1989 | Japan | 210/151 |

OTHER PUBLICATIONS

Bachmann et al., "Comparison of Fixed-Film Reactors With a Modified Sludge Blanket Reactor" in Fixed-Film Biological Processes For Wastewater Treatment, Ed. by Wu, Y. C. and Smith, E. D., Noyes Data Corporation, N.J. (1983).

Grobicki et al., "Hydrodynamic Characteristics Of The Anaerobic Baffled Reactor", Wat. Res., vol. 26, No. 3, pp. 371–378 (1992).

Dieneman et al., "Evaluation Of Serial Anaerobic-/Erobic Packed Bed Bioreactors For Treatment Of A Superfund Leachate", J. Haz. Mat., 23, pp. 21–42 (1990).

Primary Examiner—Stanley S. Silverman
Assistant Examiner—Cynthia L. Nessler
Attorney, Agent, or Firm—Sherman and Shalloway

[57] ABSTRACT

A multi-stage anaerobic treatment device, using a pipe as a column filter, mixes sewage to create a homogeneous environment throughout the reactor while simultaneously preventing clogging of the filter. The column filter contains inclined rectangular through-holes bored systematically through the wall of the straight pipe of the column filter. Projecting baffle plates to the inside of the pipe from the respective long side of the through-holes on the same level result in counter-flow as well as cross-flow being generated not only in the column filters but also between the column filters and outside the column filters, resulting in an efficient anaerobic treatment system.

13 Claims, 4 Drawing Sheets

MULTI-STAGE ANAEROBIC PACKED COLUMN REACTOR WITH FIXED-FILM COLUMN FILTER

BACKGROUND OF THE INVENTION

This invention relates to nearly complete mixing of influent, in addition to other improvements, in a fixed-film biological column filter as disclosed in Japan Published Unexamined Patent Application 1-56196, to prevent clogging and scum.

DESCRIPTION OF THE PRIOR ART

Common problems with conventional anaerobic reactors are that complete mixing is impossible even with various kinds of equipment, which is corrodible, and the accumulation of sludge and scum prevents efficient treatment, taking much time at high temperature, in addition to channeling and difficulties in scaling up.

According to Professor Letting, to prevent channeling is the most important problem to be solved. In other words, nearly complete mixing in scaling up is the most important factor in anaerobic treatment (Anaerobic Digestion, Applied Science Publisher, 1980, p. 235).

In anaerobic digestion there is a hypothesis that the transfer to the gas phase is actually rate-limiting and, furthermore, that the normal metabolic activity of the methanogenic bacteria is inhibited by product gases.—The inhibiting factor could well be microbubbles, which decrease the bacterial surface area available for permeation processes.—Design specifications for faster systems might include vigorous agitation, low pressure, and elevated temperature (Science, Vol. 190, 12 Dec. 1975, pp. 1088-1089). In the present invention vigorous mixing instead of vigorous agitation is sought to give rise to low pressure and prevention of clogging in scaling up, simultaneously. As a result, temperature problems will be solved automatically. There has been no prior art as to this approach except for the above-mentioned previous invention where prevention of clogging, merely one of the fundamental problems, was only claimed. In the present invention almost all problems, which have been nothing but mere hopes, are practically worked out in a very simple way with completely different devices from the previous patent.

SUMMARY OF THE INVENTION

It is an object of the present invention to provide an anaerobic treatment system making use of the present invention while implementing innovative and permanent waste destruction technologies as on-site treatment of chemical and biological hazardous wastes, replacing conventional landfill disposal and ocean dumping.

Another object of this invention is to provide wastewater treatment including recycle of effluent for reuse, such as, flushing the lavatory, and scaling up so as to be applicable to a large scale activated sludge plant or pre-treatment of water in a waterworks, in addition to biogas production, thereby contributing to solution of environmental, water resources development and energy saving problems. These and other objects have been attained by employing the said anaerobic treatment devices using the said column filters.

DETAILED DESCRIPTION OF PREFERRED EMBODIMENTS

Mixing serves two basic functions. First, mixing transports food from the bulk solution to the microorganism cell wall. Second, mixing removes cell waste products (of which methane is the most important) from the cell wall to the bulk solution. In this sense, the importance of mixing has been emphasized as above-mentioned. Mixing creates a homogenous environment throughout the reactor to assure effective use of the entire reactor volume. By preventing stratification, contact between food and active biomass is promoted and any metabolic waste products produced by bacteria as well as toxic substances introduced with influent will be evenly distributed and diluted, thereby minimizing their inhibiting effect on microbial activity.

From this standpoint, the area of the lower through-holes being smaller than the area of the upper through-holes opposite thereto, as in the previous invention, produces local stratification in the lower positions of the column filter, which impedes formation of a homogeneous environment throughout that entire column filter, although clogging will be prevented at the sacrifice of homogeneity of the reactor column and longer retention time to reach the same removal rate. At the same time low pressure drop in the reactor column will be hampered when the bulk solution spouts out of the lower through-holes with smaller area than that of the upper through-holes.

The present invention seeks to overcome the above problems by insuring an equal area of all the through-holes 2 on the side wall of a column filter 1 to eliminate the above-mentioned defects produced by unequal area between the upper and lower through-holes on the same column filter. Traditionally, high efficiency, high through-put, and low pressure drop are the ideals we are looking for. When a column filter and column reactor are employed, large edge effects may be expected because substances flowing through the column would rather go to the walls than through the center of the column. Redistribution may be necessary to counteract these phenomena within the limits preventing stratification and to create a continuous and homogeneous environment by generating flow to remove microbubbles to protect the bacterial surface area available for permeation processes. For these purposes velocity of any flow must be very slow as a whole, even in vigorous mixing.

It is recognized that a carrier with plastic media of high porosity (94%) gives a performance inferior to that of clay media of a lower (69%) porosity value and that the most important parameter is the arrangement of the flow channels - the cross-flow design provided significantly better performance than the tubular flow at all loading rates. As an extension, every effort has been made to apply counter-flow to the filter, but in vain. The counter-flow regime is the one meeting the above-mentioned ideals.

Figure 1:
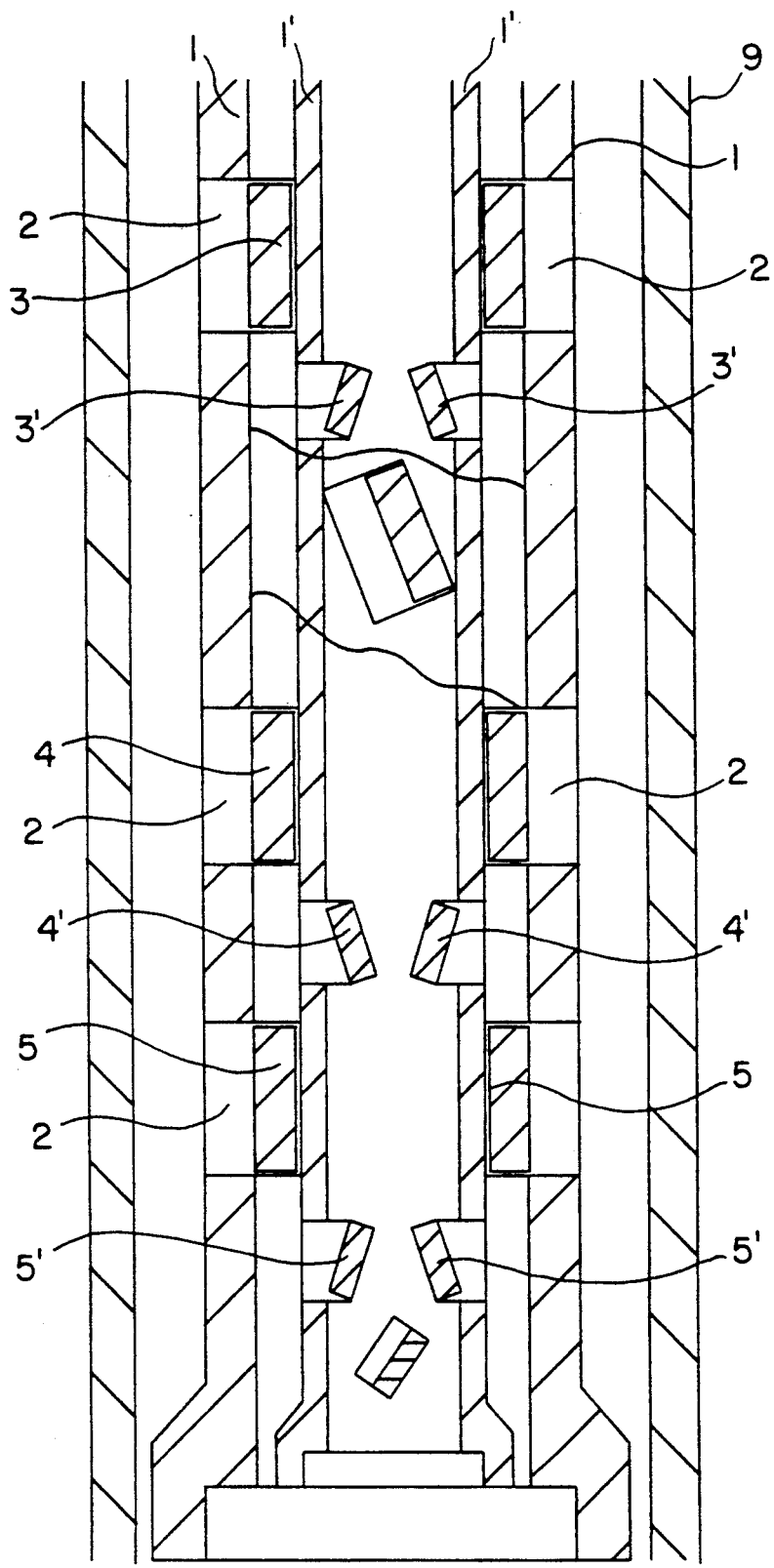
FIG. 1 is a longitudinal section taken through the axis of the column filter 1 having inclined projecting baffle plates 3,4,5 provided on one long side of rectangular through-holes 2 bored on the said wall of a straight pipe. On the same level and at a symmetrical positions about the center line of the column filter at least two pairs of rectangular through-holes and baffle plates are provided.
Figure 2:
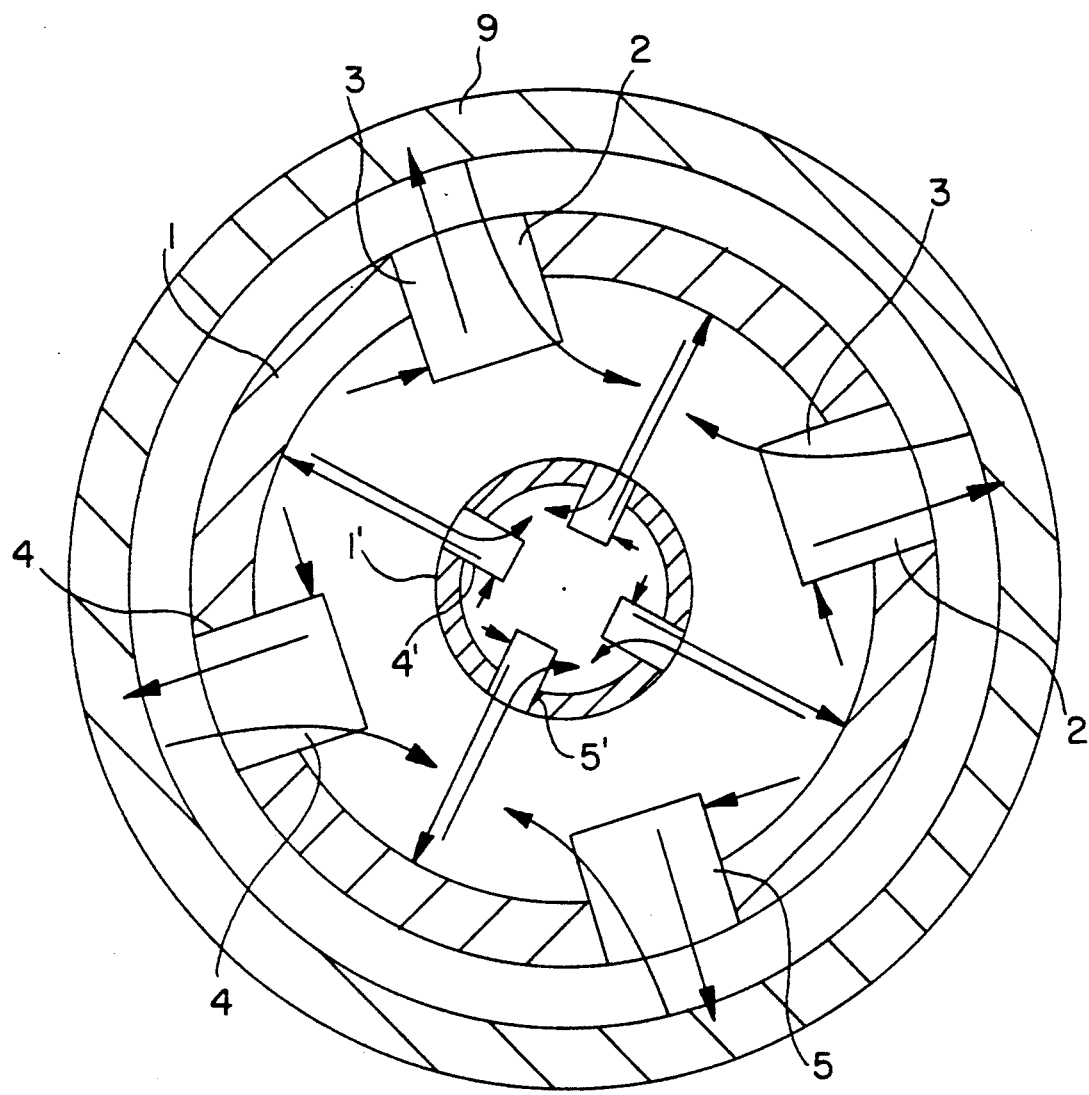
FIG. 2 is a plan view illustrating the formation of cross-flow.

In the present invention many through-holes 2 are provided in the side wall of the straight pipe which is column filter 1 and 1' and baffle plates 3,3',4,4' and 5,5' are provided on a long side of the through-holes as illustrated in FIG. 1 and FIG. 2, where the baffle plate 3 is provided on the side face which is one of the side faces dividing the peripheral wall of the pipe 1 equally to 4 parts and is on the same level as the level of the said face adjacent to the one face after said face. the area of a baffle plate is the same as that of the through-hole in the same pipe. The exact same structure is provided in the position rotated about 90° bending on one long side of a rectangular through-hole to a perpendicular direction from the said wall in the stage of shaped clay before baking, after perforating the other three sides of the through-hole. Inclination of a baffle plate to the center line of the column is equal to the complementary angle of those of the baffle plates on both sides of it. This relative relation is formed between through-holes on the higher and lower level of the same column filter. As a result, flow of influent flowing into the pipe from the upper part of the pipe through a through-hole 2 flows along the baffle plate 3. The area of the lower through-hole is almost the same with the area of the upper through-holes opposite thereto and since the outflow rate undergoes no change, much of the outflow passes the rectangular through-hole and then collides with the inside wall of the inside pipe, generating back flow to generate counter-flow in the pipe. The similar phenomena are generated in the pipe along the direction of the baffle plates 3,3',4,5 in the positions rotated by 90°, by which the flow from them intersects with each other and runs down, generating cross-flow. These phenomena are essential for scaling up of the present invention to be applicable to a large scale wastewater treatment plant.

Up to here only one small pipe of filter column 1 has been described with respect to an outside layer pipe of column reactor 9 or 11. However, more than two pipes can hold the same center line or axis in common with the column reactor. Each inside pipe has the same structure with the above-mentioned small pipe having inclined and rectangular through-holes with baffle plates. However, any part of two through-holes on adjacent pipes should not be duplicated on the same radius of the column reactor, so that collision of outflow from an inside pipe may always take place at the inside wall of the outside pipe after passing through a through-hole of the inside pipe, generating back flow to generate counter-flow around and inside of the through-hole of the inside pipe. On the other hand, inclined baffle plates between both pipes repel downflow or upflow to generate cross-flow between the adjoining baffle plates. These functions of the baffle plates of the present invention are shown by the arrows in FIG. 2, and are quite different from those of the previous invention which can contribute nothing to scaling up of the device. The distance between the two pipes should not fall below 10 centimeters and specific surface area of filters can increase considerably along with complete prevention of clogging. Materials used for the pipe and column filter should be stainless steal coated with fired red drain tile clay for the large plant, because size of the pipe and filter can be increased to any degree without being corroded. However, in small wastewater treatment systems earthenware and fired red drain tile clay are suitable for pipe and column filters, respectively.

Figure 3:
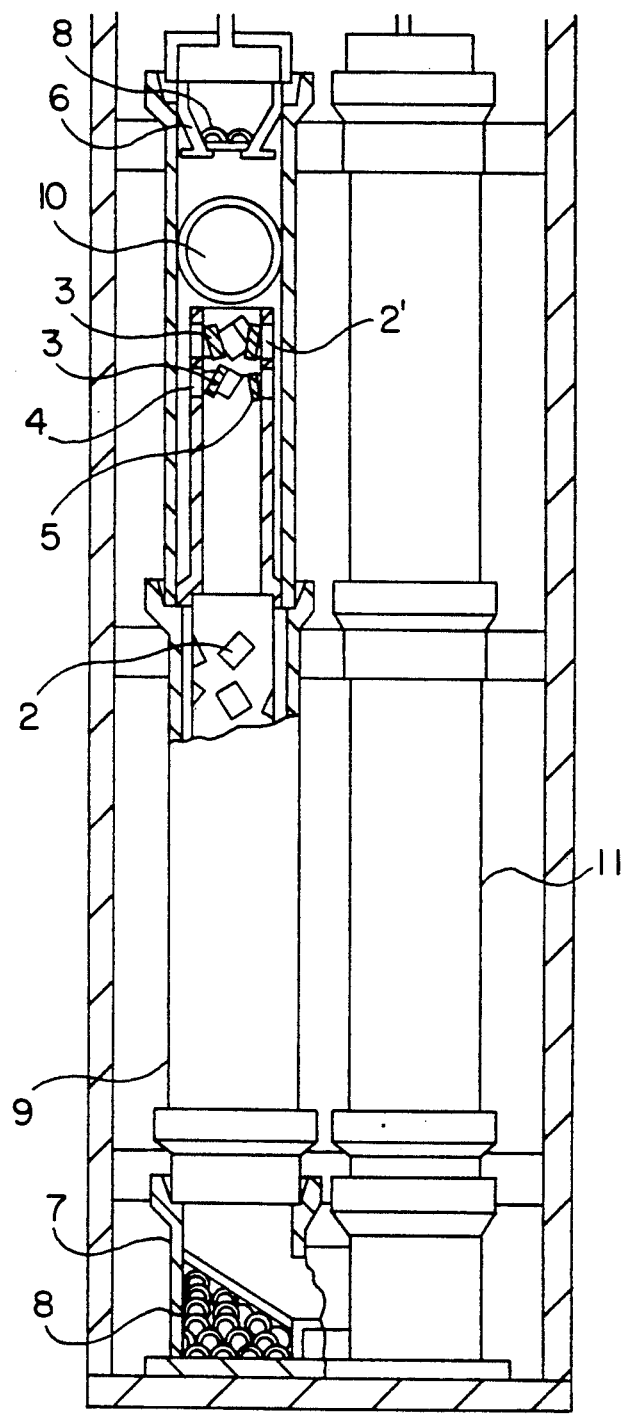
FIG. 3 is a partially sectional view of downflow 9 and upflow 11 reactor columns including column filters 1, from the side wall of which the maximum number of projecting baffle plates 3,4,5 are provided on the respective long side of the rectangular through-holes 2 and 2', unglazed flowerpot shaped member 6 having fragments 8 of fired red drain tile clay on the bottom with a large opening to prevent scum accumulation, entry 10 from a previous upflow reactor, and coupling box 7 connecting downflow column 9 with upflow column 11 having fragments 8 of fired red drain tile clay on the base of it to provide a V-shaped flow channel.

In this reactor, influent is first introduced into a downflow stationary fixed-film reactor 9 with column filters 1 from the entry 10. Next comes an upflow stationary fixed-film reactor 11 having the same structure as the downflow reactor 9 after passing a coupling box provided with V-shaped flow channel made of fragments of fired red drain tile clay 8 as illustrated in FIG. 3. The sequence of downflow followed by upflow is repeated the necessary number of times to give sufficient anaerobic treatment, giving a multi-stage bioreactor with plug-flow.

Upflow in this system plays a role of sludge drawoff to some extent in the plug-flow of this reactor. It is recognized by L. V. d. Berg and K. J. Kennedy who have been making research in a down-flow stationary fixed-film reactor that in the conventional anaerobic downflow stationary fixed-film reactor there is little need for elaborate agitation and the downflow mode allows removal of effluent and suspended solids from the bottom of the reactor, thereby preventing plugging. In experiments, however, accumulation of some sludge was recognized in the bottom of the U-shaped coupling device connecting the downflow and upflow column reactors in the previous patent. In the present application, an improvement has been provided by making the coupling box 7 as above-mentioned. Experiments in the last six years prove that no clogging occurred at all when diameter of flow channel exceeds 10 centimeters and fired red drain tile clay is provided in the bottom of the coupling box which is extremely powerful in decomposing sludge, while in the previous patent such device was not provided to the coupling means. Additionally, the area perpendicular to the flow must be kept to a minimum to prevent solids buildup. This is the reason of providing V-shaped flow channel protected by fired red drain tile clay fired in the present patent instead of U-shaped channel without protection as in the previous patent and as a result about 50% of space can be saved. Application of some machine for manufacturing column filter is possible, instead of hand making as in the previous patent. There is no difference between the two patents about a flowerpot-shaped vessel 6 filled with fired red drain tile clay to prevent scum accumulation and possible high pressure.

For an experiment illustrative of the present invention, an apparatus was constructed and the start-up was made at a substantially lower temperature, i.e. around 15° C., and was seeded with digested sludge removed from a municipal night soil treatment plant which filled the entire volume of the primary anoxic reactor consisting of a five-stage column bioreactor and the secondary anoxic reactor consisting of a three-stage column bioreactor, the primary and secondary aerobic reactors consisting of oxidation ditches filled with fragments of fired red drain tile clay, both of which were expected to uptake phosphorous compounds to some extent. The height of the column reactor was three meters.

Figure 4:
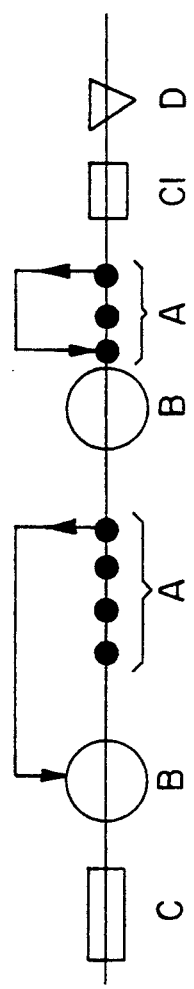
FIG. 4 is an example of wastewater treatment system, comprising serial anaerobic packed column bioreactors A, primary settling tank C, aerators B, final settling tank C1, and phosphorus removal means D.

A 10 cubic meter primary settling tank was set up ahead of the primary anoxic reactor, which was followed by an aeration tank and the primary aerobic reactor for nitrification. The final settling tank was after the secondary aerobic reactor as depicted in FIG. 4.

After 30 days of acclimation when the sludge disappeared from the ditches, operation of the process was started with daily load of 10 cubic meter of the sludge from the same plant and steady-state performance of it was studied with the same sludge.

In general TKN/COD ratio of it were around 0.18, which makes it very difficult to obtain complete dentrification. Furthermore, P/COD was around 0.07, being beyond P removal of the aerobic activated sludge process. In addition to it, TSS/COD and BOD/COD were ranging from 2.25 to 1.95 and 0.03 to 0.17, respectively. COD ranged from 6,880 mg/l to 2,740 mg/l. Removal of TKN and P were ranging from 95% to 90% and 98% to 91%, respectively. Removal of COD and BOD were ranging from more than 99% to 96% and 97% to 82%, respectively. What was the most important was removal of TSS, which never fell below 99% after 6 hours of HRT in all cases in spite of the very simple reactors, low temperature less than 16° C. and no recycle. Of course there was no accumulation of sludge in any place of the system. Machines employed were pumps at the primary and the secondary tank, following the law of natural falling of water, and an aerator at an inlet to the secondary reactor. These results are almost equal to the so-called most advanced plants of the same night soil treatment, price of which will be 10 times more. But the life of them will be 0.2 times, because except for machines all materials used here are incorrodible. Furthermore, they can not get rid of accumulation of some sludge without biogas production.

What is claimed is:

1. A column filter for anaerobic wastewater treatment comprising:
    a vertical column defining a fixed film reactor having a top and a bottom and a vertical axis;
    a plurality of through-holes through said column, said through-holes having a rectangular cross-section comprising a pair of parallel long sides and a pair of parallel short sides wherein the long sides of each rectangular through-hole are inclined to the vertical axis of the column, said through-holes being arranged in at least more than one circular grouping around the column, wherein each circular grouping of said through-holes is parallel with any next successive grouping of said through-holes, said grouping of said through-holes being arranged from the top of the column to the bottom of the column, the area of said through-holes at the bottom of the column being the same as the area of said through-holes at the top of the column, thereby limiting pressure increases during operation of the column filter; and
    a baffle plate provided with each said through-hole on one long side of the through-hole, said baffle plate having the same area and shape as said through-hole and extending inward of said column perpendicular to the column.

2. The column filter according to claim 1, wherein said column filter is comprised of materials which resist corrosion.

3. The column filter according to claim 2 wherein the column filter is comprised of clay.

4. The column filter according to claim 3, wherein the clay is fired red drain tile clay.

5. The column filter according to claim 2, wherein the column filter is comprised of stainless steel coated with fired red drain tile clay.

6. The column filter according to claim 1, wherein said through-holes are positioned 90° from each other within a circular grouping.

7. The multi-purpose anaerobic wastewater treatment system comprising a down flow stationary fixed film reactor comprising:
    an outermost tubular member;
    an inner column filter, positioned within the tubular member, said column filter comprising
        a vertical column having a top and a bottom and a vertical axis;
        a plurality of through-holes through said column, said through-holes having a rectangular cross-section comprising a pair of parallel long sides and a pair of parallel short sides wherein the long sides of each rectangular through-hole are inclined to the vertical axis of the column, said through-holes being arranged in at least more than one circular grouping around the column, wherein each circular grouping of said through-holes is parallel with any next successive grouping of said through-holes, said grouping of said through-holes being arranged from the top of the column to the bottom of the column, the area of said through-holes at the bottom of the column being the same as the area of said through-holes at the top of the column, thereby limiting pressure increases during operation of the treatment system; and
        a baffle plate provided with each said through-hole on one long side of the through-hole, said baffle plate having the same area and shape as said through-hole and extending inward of said column perpendicular to the column;
    and an innermost filter column within said inner filter column, wherein the reactor column, the inner column filter and the innermost filter column form an inner annulus and an outer annulus and extend downward into a borehole;
    an entry from a previous upflow reactor; and a coupling box connecting said downflow column to any subsequent upflow column.

8. The multi-purpose wastewater treatment system according to claim 7, wherein the system is comprised of materials which resist corrosion.

9. The multi-purpose wastewater treatment system according to claim 8, wherein the system is comprised of clay.

10. The multi-purpose wastewater treatment system according to claim 9, wherein the clay is fired red drain tile clay.

11. The multi-purpose wastewater treatment system according to claim 7, wherein the through-holes are arranged in groupings of four holes each.

12. The multi-purpose wastewater treatment system according to claim 7, wherein said baffle plates are positioned 90° from each other within a circular opening.

13. The multi-purpose wastewater treatment system according to claim 7, further comprising fired red drain tile clay fragments in said coupling box to form a V-shaped flow channel.

* * * * *

UNITED STATES PATENT AND TRADEMARK OFFICE
CERTIFICATE OF CORRECTION

PATENT NO. : 5,254,245
DATED : October 19, 1993
INVENTOR(S) : TSUTOMU ARIMIZU

It is certified that error appears in the above-indentified patent and that said Letters Patent is hereby corrected as shown below:

On the Title Page, item [76] at Inventor, delete "Tsutome",
insert --Tsutomu--

Signed and Sealed this

Twenty-third Day of August, 1994

Attest:

BRUCE LEHMAN

Attesting Officer

Commissioner of Patents and Trademarks